US011829358B2

(12) United States Patent
Kar et al.

(10) Patent No.: US 11,829,358 B2
(45) Date of Patent: Nov. 28, 2023

(54) SYSTEMS AND METHODS FOR NATURAL LANGUAGE QUERIES

(71) Applicant: Honeywell International Inc., Morris Plains, NJ (US)

(72) Inventors: Satyanarayan Kar, Bangalore (IN); Prabhjit Thind, Ludhiana (IN); Rakesh Chandra Balabantaray, Morris Plains, NJ (US); Sthita Pragyan Pujari, Morris Plains, NJ (US); Julie Vasquez, Phoenix, AZ (US); Harmanpreet Singh, Bareta (IN); Shashidhara Ganganna, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 210 days.

(21) Appl. No.: 17/086,009

(22) Filed: Oct. 30, 2020

(65) Prior Publication Data

US 2021/0141793 A1    May 13, 2021

Related U.S. Application Data

(60) Provisional application No. 62/933,565, filed on Nov. 11, 2019.

(51) Int. Cl.
*G06F 16/2452* (2019.01)
*G06F 16/242* (2019.01)

(52) U.S. Cl.
CPC ...... *G06F 16/24522* (2019.01); *G06F 16/243* (2019.01)

(58) Field of Classification Search
CPC .......... G06F 16/24522; G06F 16/243
See application file for complete search history.

(56) References Cited

U.S. PATENT DOCUMENTS

2010/0191458 A1*  7/2010  Baker ............... G06Q 30/0601
                                                    705/40
2011/0320498 A1* 12/2011  Flor ..................... G06F 16/322
                                                    707/E17.087

(Continued)

FOREIGN PATENT DOCUMENTS

WO      2019063449 A1    4/2019

OTHER PUBLICATIONS

Extended European Search Report dated Mar. 22, 2021 in counterpart European Patent Application No. 20206279.0 (8 pages, in English).

*Primary Examiner* — Richard L Bowen
*Assistant Examiner* — Aryan D Toughiry
(74) *Attorney, Agent, or Firm* — Bookoff McAndrews, PLLC (57) ABSTRACT

In an example, a computer-implemented method for natural language query translation comprises: receiving, by one or more processors, a natural language query; processing, by the one or more processors, the natural language query to identify an intent and a variable of the natural language query; converting, by the one or more processors, the identified variables into low-level variables; combining the identified intent and the low level variables to form a database expression; querying, by the one or more processors, a database storing flight information, using the database expression; and creating, by the one or more processors, at least one graphical representation based on a result of the querying of the database.

20 Claims, 7 Drawing Sheets

(56) References Cited

U.S. PATENT DOCUMENTS

| | | | |
|---|---|---|---|
| 2014/0136013 A1* | 5/2014 | Wolverton | B60K 37/06 |
| | | | 701/1 |
| 2016/0267157 A1* | 9/2016 | Mutschler | G16Z 99/00 |
| 2018/0095962 A1* | 4/2018 | Anderson | G06F 16/2365 |
| 2018/0181613 A1 | 6/2018 | Acharya et al. | |
| 2019/0130213 A1* | 5/2019 | Shazeer | G06K 9/6255 |
| 2020/0104402 A1* | 4/2020 | Burnett | G06F 16/2477 |
| 2020/0198461 A1* | 6/2020 | Dudar | B60K 15/03519 |

* cited by examiner

SYSTEMS AND METHODS FOR NATURAL LANGUAGE QUERIES

CROSS-REFERENCE TO RELATED APPLICATION(S)

This application claims the benefit of priority of U.S. Provisional Patent Application No. 62/933,565, filed Nov. 11, 2019, which is incorporated herein by reference in its entirety.

TECHNICAL FIELD

Various embodiments of the present disclosure generally relate to an architecture of database query translation and, more particularly, to a deep learning architecture to translate functional textual queries in natural language into database query expressions.

BACKGROUND

Airlines desire to reduce fuel consumption by, for example, optimizing flight operations. Operators across the world are leaving tens-of-millions of dollars of potential fuel savings unrealized. Airline analytics platforms may be utilized to help analyze big data collected from aircraft operations to create opportunities for fuel savings and improving flight safety trends. Such systems may lack user-friendly functions.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF DISCLOSURE

According to certain aspects of the disclosure, systems and methods are disclosed to provide translation of natural language queries into database query expressions. Each of the examples disclosed herein may include one or more of the features described in connection with any of the other disclosed examples.

In an example, a computer-implemented method for natural language query translation comprises: receiving, by one or more processors, a natural language query; processing, by the one or more processors, the natural language query to identify an intent and a variable of the natural language query; converting, by the one or more processors, the identified variables into low-level variables; combining the identified intent and the low level variables to form a database expression; querying, by the one or more processors, a database storing flight information, using the database expression; and creating, by the one or more processors, at least one graphical representation based on a result of the querying of the database.

In another example, a computer-implemented system for natural language query translation comprises: a memory having processor-readable instructions stored therein; and at least one processor configured to access the memory and execute the processor-readable instructions, which when executed by the processor configures the processor to perform a plurality of functions, including: receiving, by one or more processors, a natural language query; processing, by the one or more processors, the natural language query to identify an intent and a variable of the natural language query; converting, by the one or more processors, the identified variables into low-level variables; combining the identified intent and the low level variables to form a database expression; querying, by the one or more processors, a database storing flight information, using the database expression; and creating, by the one or more processors, at least one graphical representation based on a result of the querying of the database.

In a further example, A non-transitory computer-readable medium containing instructions for natural language query translation includes instructions for the following: processing, by the one or more processors, the natural language query to identify an intent and a variable of the natural language query; converting, by the one or more processors, the identified variables into low-level variables; combining the identified intent and the low level variables to form a database expression; querying, by the one or more processors, a database storing flight information, using the database expression; and creating, by the one or more processors, at least one graphical representation based on a result of the querying of the database.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Systems for providing reports on, for example, fuel efficiency, diagnostics, traffic control, routing, performance, or other metrics/concepts have required users to translate their conceptual queries into an expression which can be understood by database systems. The translation has been accomplished by involving and using database analysts or other specialists. These extra steps needed to translate conceptual queries result in loss of service value and an increase in overhead expense in training airline analysts when they have to depend on specialists, and affect the adoption and usage of analytics platforms.

For example, some systems require users translating their conceptual queries into expressions either by (i) using preexisting graphical widgets to process an existing query and apply filters such as check boxes/combo boxes, or (ii) creating the expression by looking for the internal system defined variables to create the expression using simple math (e.g., "+", "−", "×", "−", Average, Mean, Sum, etc.). Furthermore, the users must determine and map the correct parameters to build the query using database variables and terms.

Furthermore, in some example systems, database variables are domain specific and may therefore require a steep learning curve for users to transform their queries into expressions using these variables configured in the database. As the result of the steep learning curve, an assortment of user manuals and guides are required to use the expression language and make custom queries.

Therefore, a need exists for a deep learning-based architecture which automatically translates functional textual queries in natural language(s) into database query expressions that an analytic database engine has the capability to understand and/or process. The present disclosure describes a method of processing queries (e.g., text queries) in natural language, as conceptualized by a user. The system automatically transforms the natural language query into an expression using the database internal variables to be interpreted and the results searched from the database. The present disclosure has the ability to identify exact or precise high-level concepts in database variables, even from sparse or spotty descriptions. Aspects of the disclosure identify operations and their corresponding operands and transform the inputs into a form which the database engine recognizes.

The present disclosure addresses the transformation process performing five steps (e.g., answering five questions) in an integrated pipelined architecture for flight operational queries. The steps include: 1) identifying "what" the operation is, using the query, 2) finding "where" the operands are for the operations and "how many" operands there are there in the query, 3) determining the standard name of the operand that maps to the concept described in the query, 4) determining the expression, and 5) identifying what/where the filters are. The present disclosure provides a solution which generalizes across multiple ways the same query may be phrased (because different users may use different phrasings, or the same user may use different phrasing over time) without formulating explicit rules, generating database or database-like queries which can be inputted in a database engine.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Figure 1:
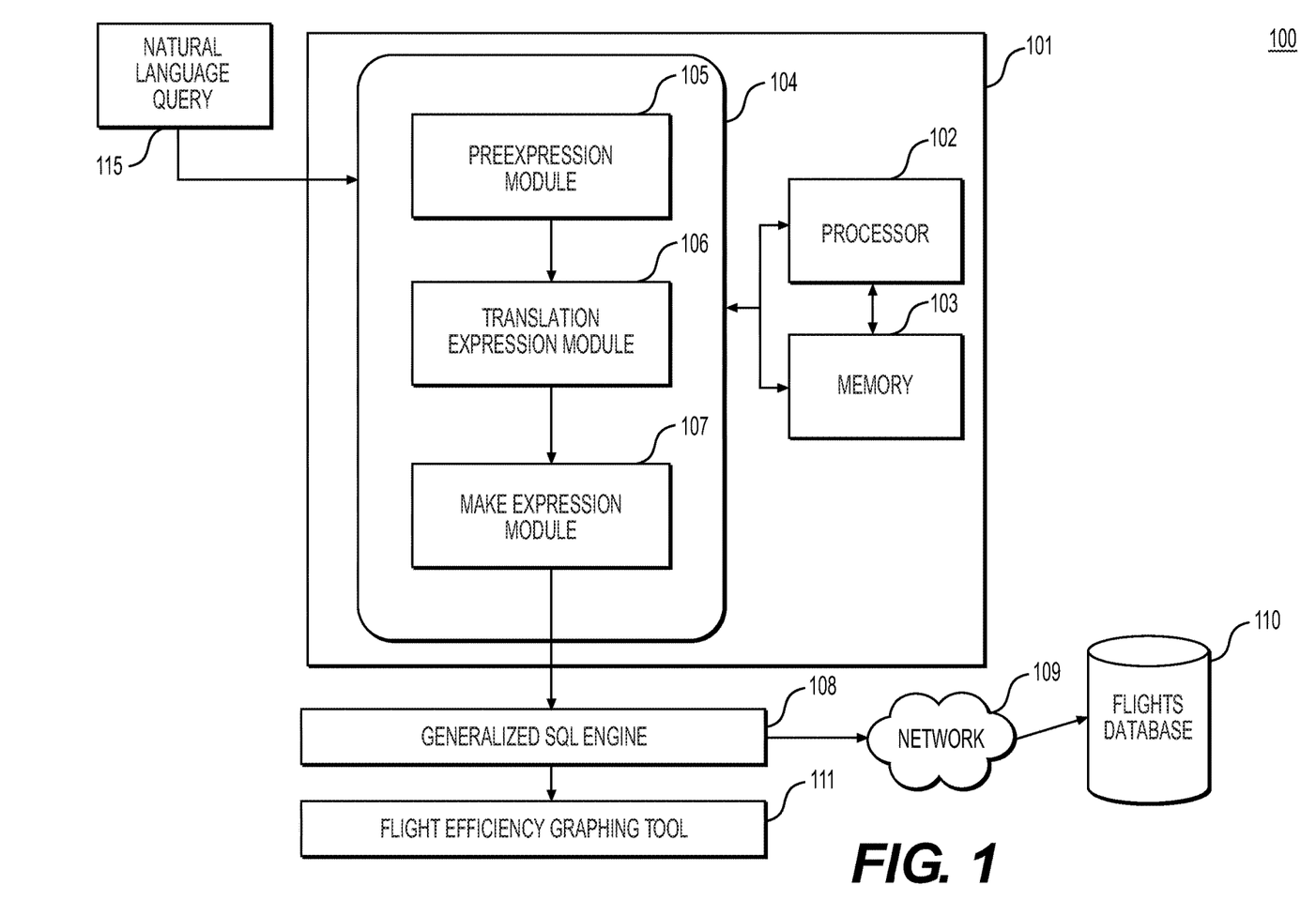
FIG. 1 depicts an exemplary environment in which systems, methods, and other aspects of the present disclosure may be implemented.

Referring now to the appended drawings, FIG. 1 depicts an exemplary environment 100 in which systems, methods, and other aspects of the present disclosure may be implemented. Environment 100 includes a computing device 101, generalized SQL/NOSQL engine 108, network 109, flight database 110, and flight efficiency graphing tool 111, for receiving and processing a natural language query 115. Other configurations also fall within the scope of this disclosure. For example, a database engine (e.g., generalized SQL/NOSQL engine 108), flight efficiency graphing tool 111, and/or natural language query engine 115 may be components of computing device 101, or may be combined in various combinations in devices separate from computing device 101. The particular arrangement of elements shown in FIG. 1 is merely exemplary. Furthermore, elements of environment 100 may be omitted or combined within the scope of this disclosure.

The computing device 101 includes processor (CPU) 102, memory 103, and translation engine 104. Translation engine 104 includes any suitable elements, such as the examples provided herein. In one example, translation engine 104 includes a pre-expression module 105, translation expression module 106, and make expression module 107. Details of these modules of translation engine 104 are described below. In an example, pre-expression module 105 identifies operators and operands. Translation expression module 106 identifies relevant entities (e.g., variables) that are known in, for example, flights database 110. Make expression module 107 composes an expression for interpretation by generalized SQL/NOSQL engine 108.

In an example, a natural language query includes the following sentence: "Show the comparison between the actual fuel used between take off and landing with the block fuel in percentage." Pre-expression module 105 identifies the operation "compare" and the operands/variables "actual trip fuel" "block fuel." Translation expression module 106 identifies entities "TRIP_FUEL_ACT_CALC" and "BLOCK_FUEL" as corresponding to the operands/variables identified by pre-expression module 105. Make expression module 107 composes an expression for processing by SQL/NOSQL engine 108: "sum[TRIP_FUEL_ACT_CALC)*100/sum(BLOCK_FUEL)."

In an example, generalized SQL/NOSQL engine 108 communicates with flight database 110 via network 109. Alternatively, generalized SQL/NOSQL engine 108 may communicate with flight database 110 directly without a network. Although generalized SQL/NOSQL engine 108 is referred to below, it will be appreciated that other types of engines, utilizing other database management systems/languages (e.g., MySQL, Oracle Database, IBM Db2, PostgreSQL, SAP HANA, Toad, Amazon Relational Database Service, SQLite, SchemeQL, CLSQL) may be used additionally or alternatively within the scope of the disclosure. In other alternatives, flight database 110 and may be in communication with other elements of environment 100, such as computing device 101.

In an example, natural language query 115 is received from a user and may be input 77p into the translation engine 104. The user provides the natural language query 115 by, for example, text and/or by speech. Environment 100 may include a module for converting speech to text, or speech may be processed directly. In one example, a user types natural language query 115 into a user interface (e.g., a text box) or provides a voice query via a user interface. Alternatively, natural language query 115 may be entered in a separate application and uploaded to environment 101. For example, a post-flight report may be generated by another application (or by a component of environment 100) and uploaded to environment 101.

Example natural language queries 115 are provided below for illustrative, non-limiting purposes. The systems and methods described herein are not limited to such queries.

What is the $CO_2$ emitted for the last three quarters?
Compare the block fuel vs the trip fuel for the last flight
Show the fuel used during the cruise every month for the past year
Show the difference between the planned block fuel and the actual block fuel
Compare the actual fuel used between takeoff and landing with the planned trip fuel In an example, natural language query 115 is then processed by translation engine 104. In an example, natural language query 115 is processed by pre-expression module 105, translation expression module 106, and make expression module 107. In some examples, natural language query 115 is processed in parallel by the three modules 105-107. In other examples, natural language query 115 is processed in series by the three modules 105-107. Further details of the operation of modules 105-107 are provided below. The translation engine 104 outputs a translation of natural language query 115 as an expression using database internal variables to be interpreted by generalized SQL/NOSQL engine 108 (or another component, as described above).

In an example, generalized SQL/NOSQL engine 105 interprets the translation and performs a search from flight database 110. Flight database 110 may have any suitable format and includes data used in answering or providing information regarding natural language query 115. Flights database includes information regarding flights. For example, flight database 110 may include information regarding actual fuel usage, planned fuel usage, carbon dioxide (or other) emissions, block fuel, stages of flights, types of aircraft, trip metrics, weather, routes, or other information. The information in flight database 110 may include information for a variety of parameters. For example, flight database 110 may include data pertaining to a particular vehicle or a particular trip. Flight database 110 may additionally or alternatively include data relating to multiple vehicles, multiple trips, different windows of time, particular geographical areas, etc. Although flight database 110 is referred to herein, it will be appreciated that, alternatively, a database used may store other types of data for responding to natural language queries 115 (e.g., land-based travel data or other types of data).

In an example, the results of the search are then transmitted to. flight efficiency graphing tool 111. Flight efficiency graphing tool 111 includes capabilities to provide a graphical representation of results of natural language query 115 to the user. Flight efficiency graphing tool 111 may include a user interface for providing information in a variety of manners. Although graphical representations are referred to herein, it will be appreciated that results of natural language query may be presented via text, audio, video, animation, or any graphical form. Although flight efficiency graphing tool 111 is referred to herein, it will be appreciated that the disclosure is not limited to flights and/or flight efficiency. Within the scope of the disclosure, results of other queries may also be displayed. For example, results of other flight-based queries may be displayed. Results of queries related to ground-based transportation or non-transportation based queries may also be presented and/or displayed.

Although flight efficiency graphing tool 111 is referred to herein, it will be appreciated that other types of tools may also be used (e.g., graphing or other visualization tools for ground-based transportation or air-based transportation). Flight efficiency graphing tool 111 may be a component of other elements described above (e.g. computing device 101), By way of example, a natural language query may be received by environment 100. The natural language query may include the following sentence: "Compare the actual fuel used between takeoff and landing with the planned trip fuel for the last three flights for the entire fleet." Elements of environment 100 may process the natural language query to develop a query that is able to be processed by a database tool (e.g., SQL/NOSQL engine 105).

In a first step, a component of translation engine 104 (e.g., pre-expression module 105) identifies what the operation is. In the example above, the operation is identified as "compare." In a second step, a component of translation engine 104 (e.g., pre-expression module 105) determines where the operands/variables are located in the query and how many operands/variables there are. In the example above, the two operands/variables are "actual fuel used between takeoff and landing" and "planned trip fuel." In a third step, a standard name (which may be referred to an entity) is identified that corresponds to the concept described by the operands in the query. In the example above, the phrase "actual fuel used between takeoff and landing" corresponds to a known entity "actual trip fuel." The phrase "planned trip fuel" corresponds to a known entity "planned trip fuel." In a fourth step, an expression may be developed to perform the operation using the operands. In the example above, such an expression may be "TRIP_FUEL_ACT_CALC;TRIP_FUEL_PLAN." The expression may be understandable by a database tool/engine (e.g., SQL/NOSQL engine 105). The order of the steps above is merely exemplary; other orders may be used.

Environment 100 may also identify filters in an expression, at an appropriate step. For example, filters may be identified in one of the steps above or in a separate step, performed in any appropriate order. In the example above, the phrase "last three flights for the entire fleet" includes two filters. The phrase "for the entire fleet" identifies a filter that includes all of the fleet. The phrase "last three flights" identifies a filter that includes only the three most recent flights. Other exemplary filters may include a start select time or start end time, or other types of filters.

As indicated above, FIG. 1 is provided merely as an example. Other examples are possible and may differ from what was described with regard to FIG. 1. The number and arrangement of devices and networks shown in FIG. 1 are provided as an example. In practice, there may be additional devices, fewer devices and/or networks, different devices and/or networks, or differently arranged devices and/or networks than those shown in FIG. 1. Additionally, or alternatively, a set of devices (e.g., one or more devices) of environment 100 may perform one or more functions described as being performed by another set of devices of environment 100.

Figure 2:
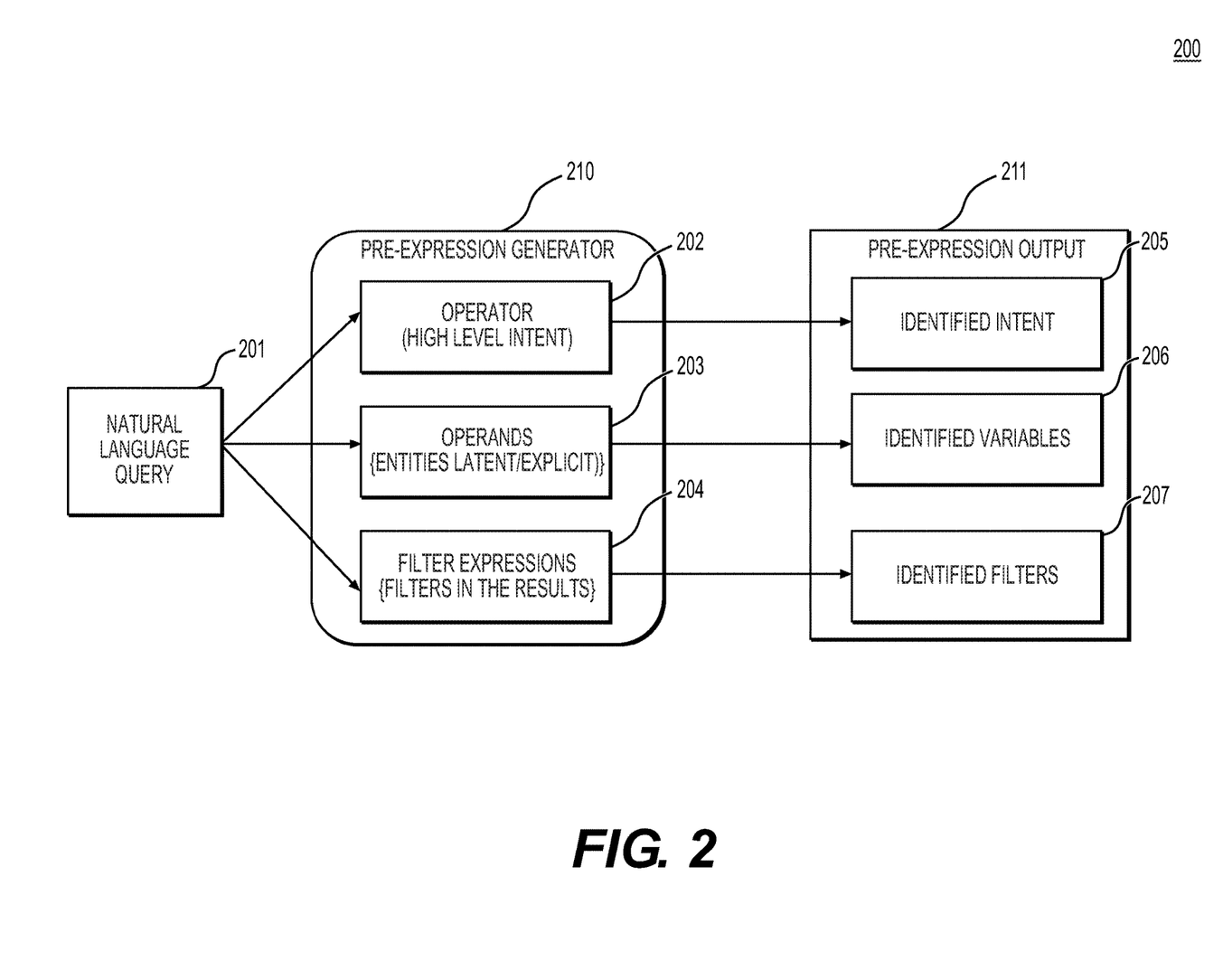
FIGS. 2 and 3 depict aspects of systems for transforming natural language queries into database queries.

FIG. 2 depicts an exemplary flow 200 of data through a pre-expression generator, according to one aspect of the present disclosure. In flow 200, a natural language query (NLQ) 201 is received from a user and transmitted to a pre-expression generator 210. NLQ 201 may have any of the properties of NLQ 115, described above. In an example, pre-expression generator 210 corresponds to the pre-expression module 105 illustrated in FIG. 1. Any of the functions described below for pre-expression generator 210 may be ascribed to pre-expression module 105. Pre-expression generator 210 outputs a pre-expression output 211.

Pre-expression generator 210 performs the relevant determinations described above: identifying 1) "what" the operation is, using the query, 2) finding "where" the operands are for the operations and "how many" operands there are there in the query, 3) determining the standard name of the operand that maps to the concept described in the query, 4) determining the expression, and 5) identifying what/where the filters are.

In one example, pre-expression generator 210 includes an operator module 202, an operands module 203, and a filter expressions module 204, which analyze NLQ 201 to identify an intent 205, variables 206, and filters 207, respectively. In an example, operator module 202, operands module 203, and filter expressions module 204 (and/or other modules of pre-expression generator 210) are natural language modules. Modules of pre-expression generator 210 include algorithms and dictionaries (e.g., pre-built dictionaries) including and/or trained on aerospace data. Pre-expression generator 210 converts NLQ 201 into a structured pre-expression output 211, used for further processing, as described below.

Operator module 202 determines the operator(s) of the NLQ 201. Operator(s) are indicative of the high-level intent 205 underlying the NLQ 201. Operator module 202 may possess any properties and algorithms to facilitate determination of the operator(s) of NLQ 201. The operator(s) are the portion of NLQ 201 that provide an instruction regarding what actions to perform. The "compare" operator is the intent 205 identified by operator module 202.

Operand module 203 determines the operand(s) of NLQ 201. Operands include object(s)/variables 206 of the operator(s), which the operator(s) act on. Operands module 203 possesses any properties and algorithms to facilitate determination of the operands/variables 206 of NLQ 201. The operands/variables 206 identify relevant measures or metrics, in examples.

Filter expressions module 204 determines any filter expressions/filters 207 in the query. Filter expressions include expressions that limit a query (i.e., filter a query). Filter expressions module 204 possesses any properties and algorithms to facilitate determination of the filter expressions/filters 207 of NLQ 201.

The above examples are for illustration and are non-limiting. Other types of modules may be used within the scope of the disclosure. Modules of pre-expression generator 210 may alternatively identify different aspects of NLQ 201.

As another example of the conversion by pre-expression generator 201 of NLQ 201 into pre-expression output 211, as illustrated in FIG. 2, a NLQ 201 of "Show the comparison between the actual fuel used between take-off and landing with the planned trip fuel in percentage for the last quarter" may be received from the user and inputted into pre-expressing generator 210 for processing. Operator module 202 determines the operator, which is output as the identified intent 205. In the example, above, the intent 205 is "compare (with percentage)". Operand module 203 processes NLQ 201 to determine the operands, outputting identified variables 206. In the example above, the identified variables 206 are "Actual Trip Fuel" and "Planned Trip Fuel". Filter expression module 204 identifies any filter expressions, outputting identified filters 207. In the example above, the filter 207 is "Last Quarter."

Pre-expression generator 210 may have one of a number of architectures. In one example, pre-expression generator 210 has a dependency graph architecture, as will be described in-depth below with respect to FIG. 4. The dependency graph architecture uses dependency graphs and grammatical rules to find noun phrases that enable pre-expression generator 210 to understand NLQ 201. The architecture uses a dictionary of aerospace terms with sentence embedding to process generic variations in describing a concept/variable. For example, a query "Show the time spend in the enroute zone" may be submitted by the user as NLQ 201. The dependency graph architecture determines that the focus of the user is on the phrase "time spent in the enroute zone" which includes a variation on the phrase "enroute zone time". The architecture uses rules to extract this phrase and uses a high-dimensional embedding of the phrase to check with a reverse dictionary to determine the domain terminology from the description.

In another embodiment, the pre-expression generator uses a multi-head attention based architecture, as will be described in-depth below with respect to FIG. 5. The architecture is configured to simultaneously address the "how many," "where," and "what" determinations for the NLQ, described above. In an example, the architecture determines what entities (e.g., variables/operands, operators, filters, content descriptors) are in the NLQ, how many entities are in the NLQ, and where the entities are located in the NLQ. In an example, the architecture utilizes a transformer encoder and specialized multi-head attention architecture to process an unstructured NLQ. The architecture, which includes specialized attention heads, focuses on different parts of the query (e.g., different parts of sentences of the query) to determine/analyze the most probable portions of the NLQ to include entities. The architecture locates a description of a defined entity (e.g., a variable and/or a concept description) in the NLQ, In an example, the architecture utilizes a unified pipeline to identify the entity based on the natural language description of the NLQ. (e.g., via a reverse dictionary). In an example, the architecture is simultaneously trained in one unified pipeline to be more specific to the domain specific queries. The architecture is configured to attend to multiple areas in an NLQ (e.g., multiple portions of a sentence). In one example, specialized heads focus on different portions of an NLQ/sentence of an NLQ Although FIG. 2 shows exemplary blocks, in some implementations, flow 200 may include additional blocks, fewer blocks, different blocks, or differently arranged blocks than those depicted in FIG. 2. Additionally, or alternatively, two or more of the blocks of flow diagram 200 may be performed in parallel or separately.

Figure 3:
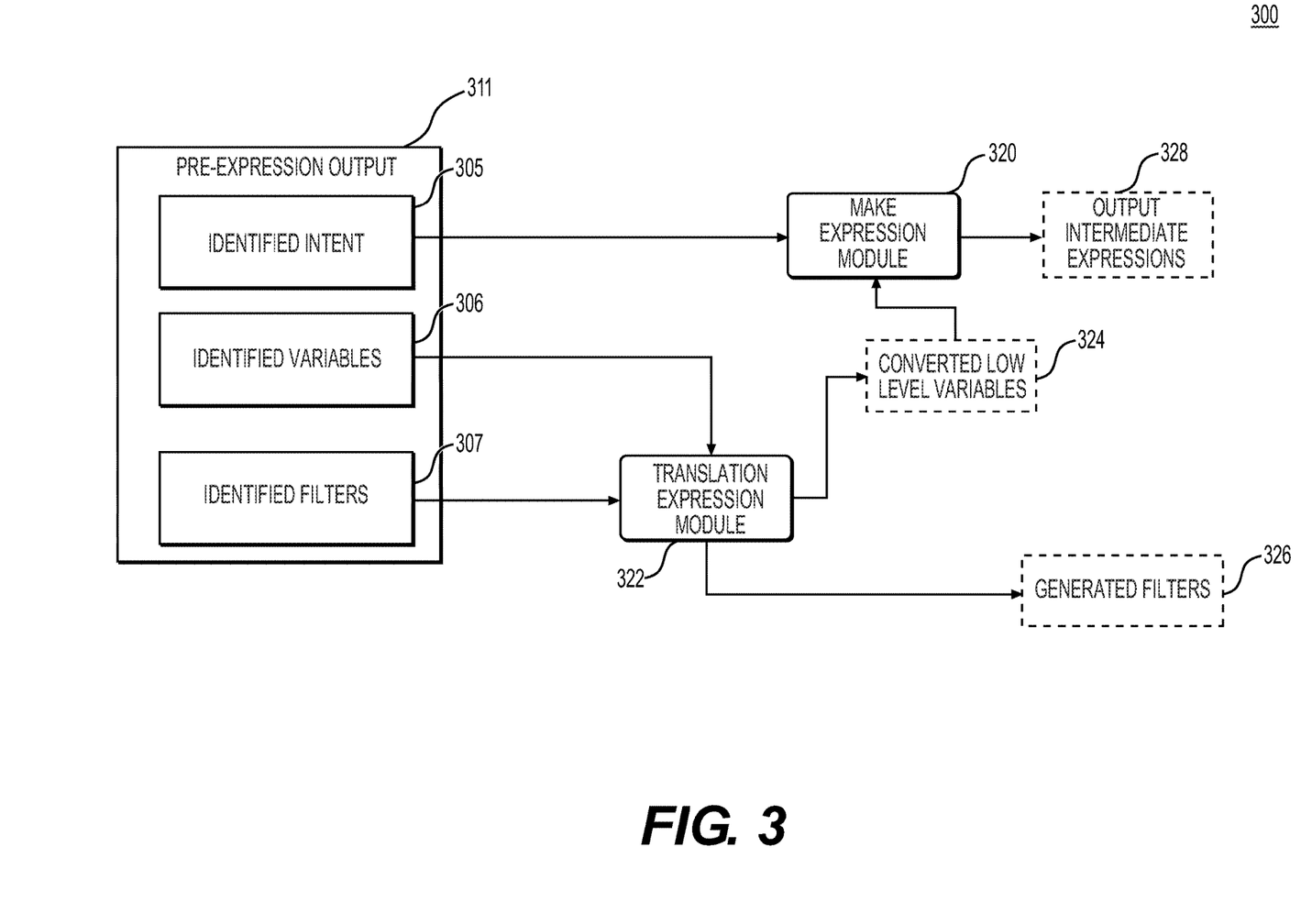

FIG. 3 depicts an exemplary flow 300 of data for transforming natural language query to database query, according to one aspect of the present disclosure. The flow 300 may follow flow 200, described above. Flow 300 may be performed by a component of computing device 101, such as by translation expression module 106 and/or make expression module 107.

In one example, a pre-expression output 311 (having any of the properties of pre-expression output 310) includes identified intent 305, identified variables 306, and identified filters 308 (having any of the properties of identified intent 205, identified variables 206, and identified filters 207, respectively). As described in further detail below, modules such as make expression module 320 (having any of the properties of make expression module 107) and translation expression module 322 (having any of the properties of translation expression module 106) further process pre-expression output 311. Although make expression module 320 and translation expression module 322 are referred to herein, it will be appreciated that additional or alternative modules may be used within the scope of the disclosure.

In an example, identified intent 305 from the pre-expression output is be transmitted to make expression module 320. Further processing of identified intent 305 will be discussed in further detail below.

In an example, identified variables 306 and identified filters 307 are transmitted to translation expression module 322. In an example, translation expression module 322 includes a concept-variable mapper and converter. Translation expression module 322 converts concepts (e.g., from identified variables 306) into low level variables 324. Low level variables 324 are more readily processed (closer to a computer system running flow 300, such as computing device 101). For variables appearing directly (and, in an example, only for variables appearing directly), translation expression module 322 maps the variables to the naming convention used in flights database 110 for execution of the query by SQL/NOSQL engine 108.

In an example, translation expression module 322 also outputs generated filters 326. Generated filters 326 may be based on identified filters 307 and may be in a format suitable for further processing. For example, identified filters 307 may be usable by generalized SQL engine 108.

Converted low level variables 324 may be inputted into make expression module 320. In an example, make expression module 320 is configured to combine identified intent 305 and low level variables 324 in order to output intermediate expressions 306. Intermediate expressions 306 (e.g., formulas) are usable for designing SQL/NOSQL queries for processing by generalized SQL engine 108. Intermediate expressions 306 associate identified operands/intents 305, identified operators/variables 306, and/or identified filters 307 into a logical form (but possibly not yet a form able to be understood by a database engine such as generalized SL engine 108.

Continuing with the exemplary NLQ described with respect to flow 200 of FIG. 2, identified intent 305 of "compare(with percentage)" is inputted into make expression module 320. Identified variables 306 of "Actual Trip Fuel" and "Planned Trip Fuel," along with identified filter 307 of "Last quarter" are inputted into translation expression module 322. Translation expression module 322 converts identified variables 306 into low level variables 324 of "TRIP_FUEL_ACT_CALC" and "TRIP_FUEL_PLAN." Low level variables 324 are transmitted to make expression module 320. Translation expression module 322 also generates the filter "Period=(Q2)" from identified filter 307. Make expression module combines received intent 305 and low level variables 324 to generate and output intermediate expression 328 of "sum(TRIP_FUEL_ACT_CALC*100)/sum(TRIP_FUEL_PLAN)" at step 306. Other examples of NLQ translations are shown in Table 1 below.

TABLE 1

| S No. | NLQ Input | Operation | Operands | Low level Variables | Intermediate expressions |
|---|---|---|---|---|---|
| 1. | Show the block fuel | Show | block fuel | BLOCK_FUEL_ACT | BLOCK_FUEL_ACT |
| 2. | Show the fuel used during the cruise | Show | Cruise Fuel | Cruise_Fuel | Cruise_Fuel |
| 3. | Compare the actual block hours with the planned block hours | Compare | Actual block hours, planned block hours | BLOCK_TIME_ACT, BLOCK_TIME_PLAN | BLOCK_TIME_ACT; BLOCK_TIME_PLAN |
| 4. | Show how much block fuel is used per flight hour | Show | Block fuel, flight hour | BLOCK_FUEL_ACT, TRIP_TIME_ACT | Sum(BLOCK_FUEL_ACT)/sum(secToH(TRIP_TIME_ACT)) |
| 5. | Show flight lateral profile for an A320 | Show | Lateral profile | FD_LATITUDE, FD_LONGITUDE | avg(FD_LATITUDE); avg(FD_LONGITUDE) |

Although FIG. 3 shows example blocks, in some implementations, flow 300 may include additional blocks, fewer blocks, different blocks, or differently arranged blocks than those depicted in FIG. 3. Additionally, or alternatively, two or more of the blocks of flow diagram 300 may be performed in parallel, in combination, or in different orders.

Figure 4:
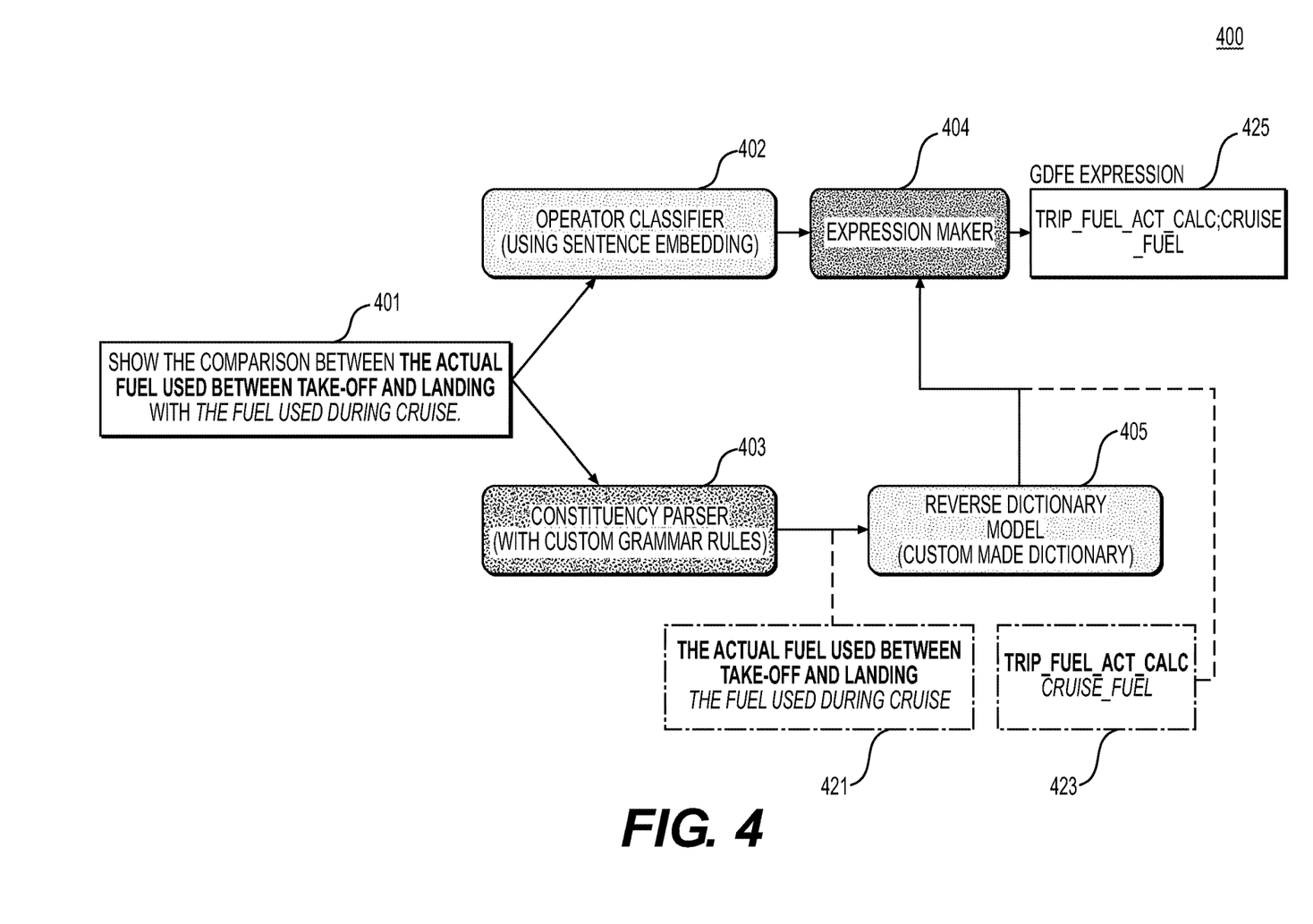
FIGS. 4 and 5 depict exemplary architectures for analyzing natural language queries.

FIG. 4 depicts an exemplary architecture 400 of a dependency graph architecture (as discussed above), according to one aspect of the present disclosure. As discussed above, architecture 400 is an example architecture of pre-expression generator 210.

Architecture 400 may receive a natural language query (NLQ) 401 from a user. An exemplary NLQ 401 is shown in box 401 of FIG. 4, but any NLQ may be input. Architecture 400 includes an operator classifier 402, a constituency parser 403, an expression maker 404, and reverse dictionary model 405.

In an example, the NLQ 401 is transmitted to both operator classifier 402 and constituency parser 403. In at least one example, operator classifier 402 uses sentence embedding techniques known or developed in the art. Sentence embedding techniques of operator classifier 402 may represent NLQ 401 (e.g., sentences of NLQ 401) as vectors. Operator classifier may identify and classify operators, as described above for operator module 202. Operator classifier 402 may correspond to operator module 202. An output of operator classifier may be identified intent 205/305. In an example, for NLQ 401 "Show the comparison between the actual fuel used between take-off and landing with the fuel used during cruise," "show" is the operator/intent determined by operator classifier 402.

In an example, constituency parser 403 includes custom grammar rules, customized for the context of the NLQ 401. For example, constituency parser 403 may include grammar rules customized for the avionics context, in order to interpret NLQs 401 relation to that context. As shown in output 421 of FIG. 4, constituency parser 403 translates a phrase in NLQ 401 corresponds to a known or more easily understood phrase. Users may phrase the same concept according to numerous, generic variations. The way a phrase is expressed may depend upon a user and may vary among the same user. In an example, constituency parser 403 determines that a phrase used in NLQ 401 is a variation on a generic phrase. For example, as shown for the NLQ 401 "Show the comparison between the actual fuel used between take-off and landing with the fuel used during cruise," constituency parser 403 determines that the phrase "the actual fuel used between take-off and landing" corresponds to the concept "the fuel used during cruise," which may be known or more easily interpreted by other components of architecture 400.

The output 421 of constituency parser 403 is input into reverse dictionary model 405, which includes a dictionary, which may be a custom-made dictionary. The custom-made dictionary may be dynamically updated in order to build a dictionary of relevant (e.g., avionics-based) terms. Alternatively, a fixed dictionary may be used. In one example, reverse dictionary model 405 translates the concept of output 421 into a variable output 423. The variable may be associated with domain terminology. Continuing with the example above, reverse dictionary model 405 determines that NLQ 401 ("Show the comparison between the actual fuel used between take-off and landing with the fuel used during cruise") is associated with variables CRUISE_FUEL and TRIP_FUEL_ACT_CALC. The variable CRUISE_FUEL may be determined from the concept "the fuel used during cruise," discussed above.

The output from both operator classifier 402 and the output 423 from reverse dictionary model 405 are input into expression maker 404 to translate the variables (from reverse dictionary model 405) and the intent (operator classifier 402) into database-specific expressions. The variables may then be input into expression maker 404 for conversion into database specific expression(s) 425, such as "TRIP_FUEL_ACT_CALC;CRUISE_FUEL," for the example above. Expression(s) 425 may be input into generalized SQL engine 108.

Although filters are not discussed specifically with respect to architecture 400, it will be appreciated that filters may also be identified by architecture 400 (e.g., by constituency parser 403 and/or reverse dictionary 405). Any identified filters may be incorporated into expression(s) 425. It will be appreciated that the components discussed for architecture 400 are merely exemplary. Different or additional components may be used, and components described above may be combined in different manners. Processes discussed above may occur in parallel or sequentially.

Figure 5:
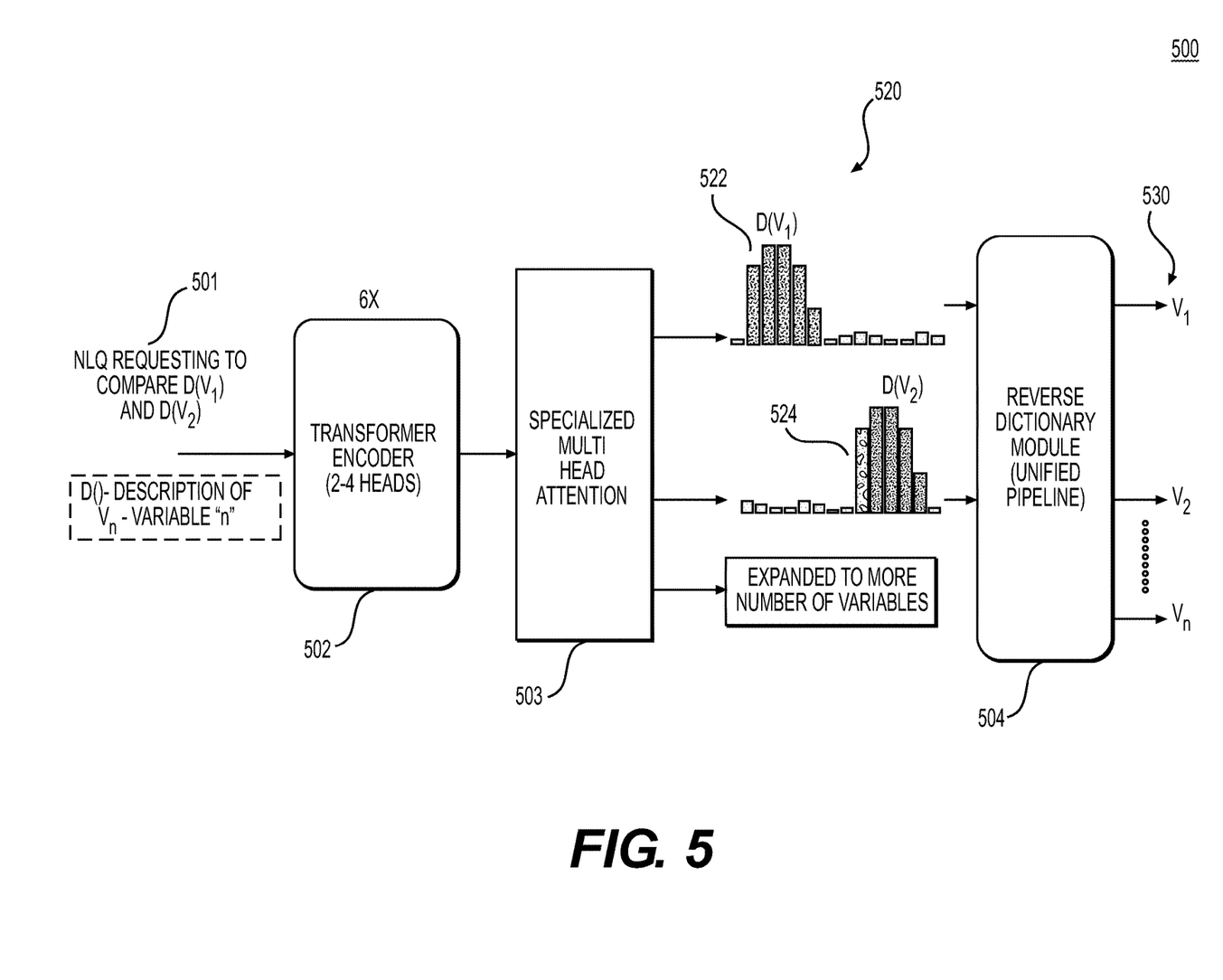

FIG. 5 depicts an exemplary architecture 500 of a multi-head attention-based architecture (discussed in overview, above), according to one aspect of the present disclosure. Architecture 500 is used, for example, for an entirety or a portion of pre-expression generator 210. An output of architecture 500 is, in examples, an entirety or a portion of pre-expression output 211. Architecture 500 may have any of the features described herein, or alternative features. Architecture 500 may include a transformer encoder 502 (having multiple heads), multi-head attention architecture 503, and reverse dictionary module 504.

In an example, NLQ 501 is received by architecture 500. As shown in the example of FIG. 5, NLQ 501 may be a request to compare two variables, such as $D(V_1)$ and $D(V_2)$, where $D(V_n)$ indicates a description of a variable $V_n$. NLQ 501 is provided by a user and may be in the natural language of a particular user, which may vary by user and among different queries from the same user.

Transformer encoder 502 may receive NLQ 501. Transformer encoder 502 may have any properties of known transformer encoders in the art. Transformer encoder 502 may include multiple encoders (e.g., six encoders, as shown in FIG. 5, although different numbers of encoders may be used.), which, in some examples, are identical to one another. In some examples, transformer encoder includes a self-attention layer and a feed-forward network (or other type of neural network).

The encoded NLQ is then input into the specialized multi-head attention architecture 503. Multi-headed attention architecture 503 may make use of any features of multi-headed attention architectures known in the art. As discussed above, specialized heads focus on different parts of the NLQ 501 to find variables and concept descriptions. The multi-head attention architecture 503 attends to multiple portions of a NLQ 501 based on the queries provided. Multi-headed attention architecture 503 may provide focus on relevant portions of the queries (including sentences of the queries). Each head of attention architecture 503 may employ vector operations in analyzing NLQ 501.

For example, as shown in FIG. 5, multi-headed attention architecture 503 analyzes different segments 520 of NLQ 501, including segments 522 and 524. As shown in FIG. 5, segment 522 may be reflective of the description of the first variable ($V_1$). Segment 522 is toward the beginning of NLQ 501. One of the heads of multi-head attention architecture 503 focuses on segment 522 to analyze the first variable. Segment 524 is toward the end of NLQ 501. Another of the heads of multi-head attention architecture 503 focuses on segment 524 to analyze the second variable. As shown in FIG. 5, additional variables/segments may also be analyzed by other heads of multi-head attention architecture 503.

The results of the analysis by multi-head attention architecture 503 is input into reverse dictionary module 504. Reverse dictionary module may have any of the properties of reverse dictionary model 405. In one example, reverse dictionary module 504 includes a unified pipeline that is updated (e.g., continuously updated) with new data sources. In an example, dictionary model 405 performs tasks including pre-processing, feature extraction, model fitting, and validation. Dictionary 405 may be continuously or periodically updated so as to provide machine learning regarding relevant terms/entities and corresponding phrases that appear in NLQs 501.

Reverse dictionary module 504 outputs, for example, a plurality of variables 530, $V_1$ through $V_n$. In an example, a number of variables corresponds to a number of segments/descriptions 520. A number of variables 530 corresponds to a number of descriptions of variables identified. In an example, variables 530 are entities that are able to be understood by, for example, generalized SQL engine 108 during further processing. Although variables 530 are referred to, it will also be appreciated that architecture 500 may identify, for example, filters and/or operators according to the same principles described for variables. Alternatively, other modules (such as those shown in architecture 400) may be used to identify filters and/or operators.

An output of architecture 500 is, in examples, a pre-expression output or a portion of a pre-expression output (e.g., pre-expression output 211). The output of architecture 500 may be further processed (e.g., by make expression module 320 and translation expression module 322, or by other modules/components) to develop intermediate expressions and/or expressions for processing by generalized SQL engine 108.

The variables and descriptions may then be input into the reverse dictionary module 504 to determine the entity and the appropriate database-specific expressions.

Figure 6:
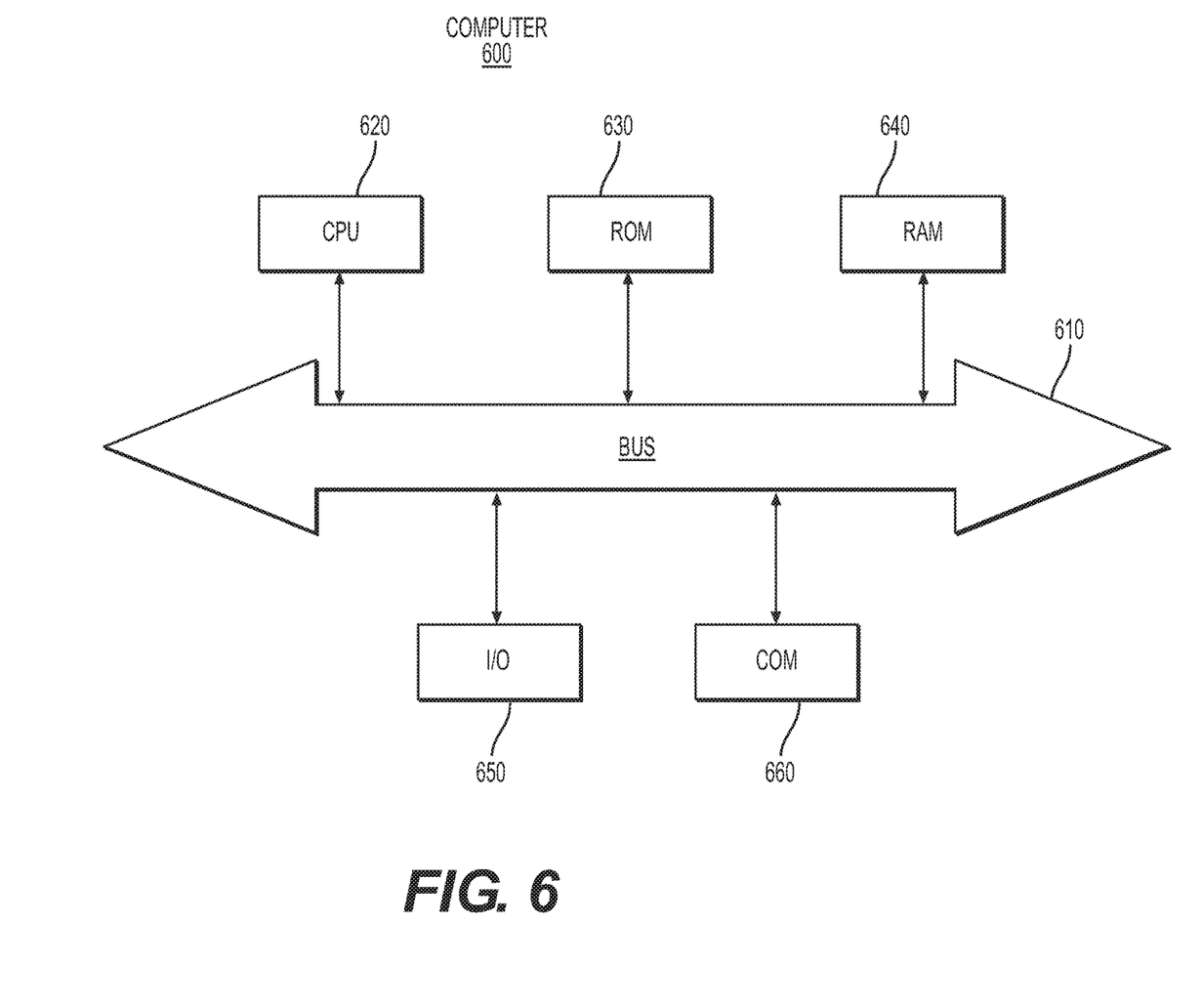
FIG. 6 depicts an exemplary computer device or system, in which embodiments of the present disclosure, or portions thereof, may be implemented

FIG. 6 depicts a high-level functional block diagram of an exemplary computer device or system, in which embodiments of the present disclosure, or portions thereof, may be implemented, e.g., as computer-readable code. Additionally, each of the exemplary computer servers, databases, user interfaces, modules, and methods described above with respect to FIGS. 1-5 can be implemented in device 600 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-5.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-5, may be implemented using device 600. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 6, device 600 may include a central processing unit (CPU) 620. CPU 620 may be any type of processor device including, for example, any type of special purpose or a general-purpose microprocessor device. As will be appreciated by persons skilled in the relevant art, CPU 620 also may be a single processor in a multi-core/multi-processor system, such system operating alone, or in a cluster of computing devices operating in a cluster or server farm. CPU 620 may be connected to a data communication infrastructure 610, for example, a bus, message queue, network, or multi-core message-passing scheme.

Device 600 also may include a main memory 640, for example, random access memory (RAM), and also may include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 600.

Device 600 also may include a communications interface ("COM") 660. Communications interface 660 allows software and data to be transferred between device 600 and external devices. Communications interface 660 may include a modem, a network interface (such as an Ethernet card), a communications port, a PCMCIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of device 600, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Figure 7:
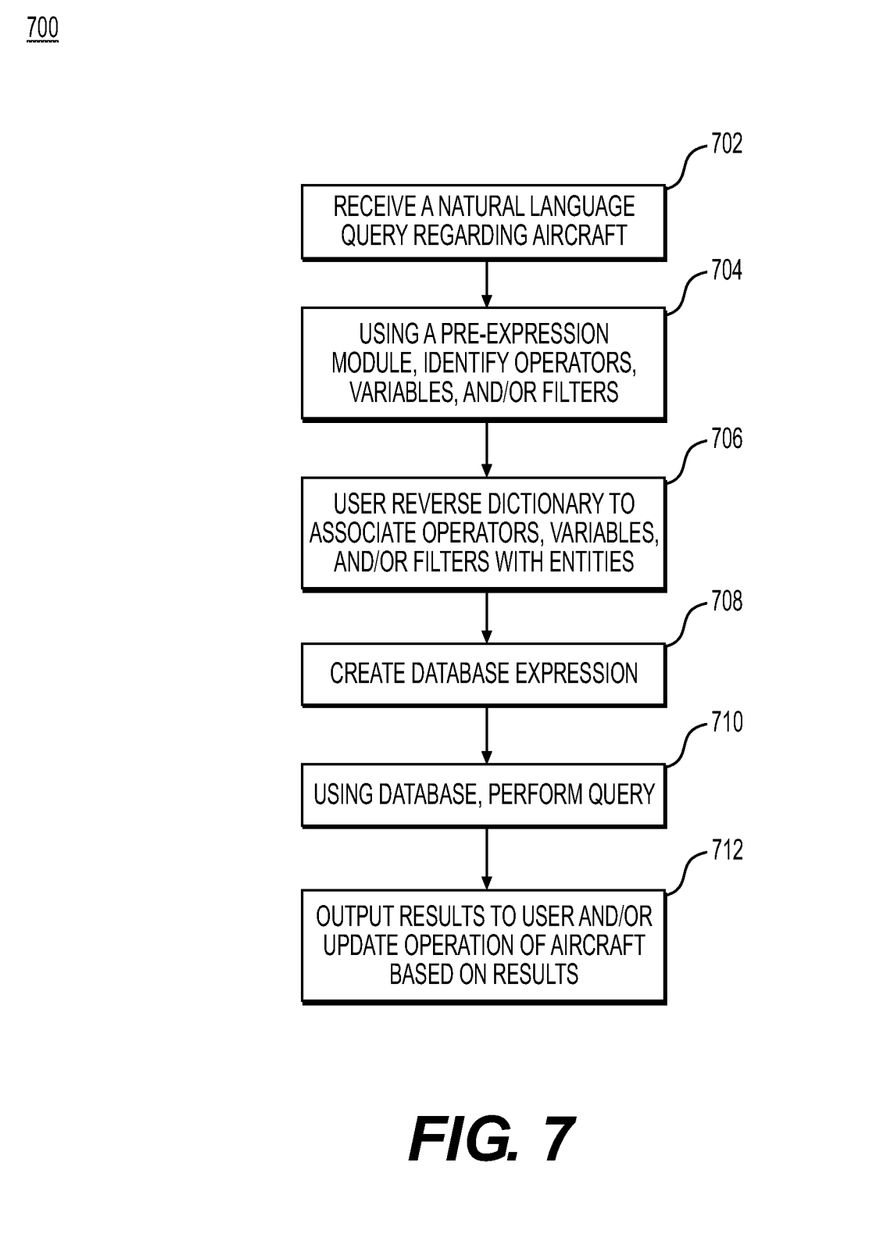
FIG. 7 depicts an exemplary method for analyzing natural language queries.

An example method 700 for processing an NLQ is provided in FIG. 7. In step 702, a natural language query regarding an aircraft is received by, for example, environment 100. In step 704, a pre-expression module (e.g., pre-expression module 105/pre-expression generator 210) identifies operators, variables, and/or filters from the query using, for example, architecture 400 or 500. In step 706, a reverse dictionary (e.g., reverse dictionary model 405 or reverse dictionary module 504) may associate operators, variables, and/or filters with entities that are known (and may correspond to aspects of flights database 110). In step 708, a database expression is created by, for example, one or more of translation expression module 106, make expression module 107, translation expression module 322, or make expression module 320. In step 710, a tool such as SQL/NOSQL engine 108 may be used to perform the query using database 110 as a source of information. In step 712, results of the query are output to a user (e.g., by flight efficiency graphing tool 111). In examples, the results of the query may also be used to update parameters of a vehicle (e.g., aircraft) in step 712. For example, parameters may be updated on the vehicle in order to obtain greater fuel efficiency. Parameters may include parameters of the aircraft that were underlying the NLQ (e.g., engine parameters, default speeds, cruising altitudes, etc.).

Examples are provided below of embodiments of the disclosure. In one embodiment, a computer-implemented method for natural language query translation may include receiving, by one or more processors, a natural language query; processing, by the one or more processors, the natural language query in a pre-expression module to identify an intent, variables, and filters of the natural language query; converting, by the one or more processors, in a translation expression module the identified variables into low level variables; converting, by the one or more processors, in the translation expression module the identified filters into generated filters; combining, by the one or more processors, in a make expression module the identified intent and the low level variables; translating, by the one or more processors, in the make expression module at least one intermediate expressions based on the combined identified intent and the low level variables; searching, by the one or more processors, a database based on the at least one intermediate expressions and the generated filters; and creating, by the one or more processors, at least one graphical representation based on a result of the searching of the database based on the at least one intermediate expressions and the generated filters.

According to another aspect of the disclosure, a computer system for natural language query translation may include a memory having processor-readable instructions stored therein; and at least one processor configured to access the memory and execute the processor-readable instructions, which when executed by the processor configures the processor to perform a plurality of functions. The functions may include receiving a natural language query; processing the natural language query in a pre-expression module to identify an intent, variables, and filters of the natural language query; converting in a translation expression module the identified variables into low level variables; converting in the translation expression module the identified filters into generated filters; combining in a make expression module the identified intent and the low level variables; translating in the make expression module at least one intermediate expressions based on the combined identified intent and the low level variables; searching a database based on the at least one intermediate expressions and the generated filters; and creating at least one graphical representation based on a result of the searching of the database based on the at least one intermediate expressions and the generated filters.

In another aspect of the disclosure, a non-transitory computer-readable medium containing instructions for natural language query translation. The instructions may include receiving, by one or more processors, a natural language query; processing, by the one or more processors, the natural language query in a pre-expression module to identify an intent, variables, and filters of the natural language query; converting, by the one or more processors, in a translation expression module the identified variables into low level variables; converting, by the one or more processors, in the translation expression module the identified filters into generated filters; combining, by the one or more processors, in a make expression module the identified intent and the low level variables; translating, by the one or more processors, in the make expression module at least one intermediate expressions based on the combined identified intent and the low level variables; searching, by the one or more processors, a database based on the at least one intermediate expressions and the generated filters; and creating, by the one or more processors, at least one graphical representation based on a result of the searching of the database based on the at least one intermediate expressions and the generated filters.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for natural language query translation, the method comprising:
   receiving, by one or more processors, a natural language query;
   processing, by the one or more processors, the natural language query to identify one or more operators and one or more operands of the natural language query;
   outputting, by the one or more processors, the one or more operators as an intent and the one or more operands as one or more variables;
   converting, by the one or more processors, one or more concepts corresponding to the one or more variables into low-level variables based on a mapping of the one or more concepts with at least one naming convention used in a database storing flight information, wherein the low-level variables correspond to one or more parameters associated with a flight of an aircraft in the at least one naming convention used in the database;
   combining the intent and the low-level variables to form a database expression;
   querying, by the one or more processors, the database storing flight information, using the database expression;
   creating, by the one or more processors, at least one graphical representation based on a result of the querying of the database; and
   updating, by the one or more processors, the one or more parameters associated with the flight of the aircraft based on the result of the querying of the database.

2. The method of claim 1, wherein the converting step includes using a reverse dictionary, wherein the reverse dictionary comprises at least one term for avionics context, and wherein the reverse dictionary comprises a unified pipeline.

3. The method of claim 1, wherein the processing step includes using multi-head attention to identify the one or more concepts.

4. The method of claim 1, wherein the processing step further includes identifying a filter of the natural language query.

5. The method of claim 1, wherein the processing step is performed by a module having a dependency graph architecture.

6. The method of claim 1, wherein the receiving, by the one or more processors, a natural language query comprises:
   receiving the natural language query corresponding to the one or more parameters associated with the flight of the aircraft, wherein the one or more parameters comprises at least one of: a fuel usage, a cruising altitude, a default speed, and an engine parameter.

7. A computer-implemented system for natural language query translation, the computer-implemented system comprising:
   a memory having processor-readable instructions stored therein; and
   at least one processor configured to access the memory and execute the processor-readable instructions, which when executed by the processor configures the processor to perform a plurality of functions, including:
   receiving a natural language query;
   processing the natural language query to identify one or more operators and one or more operands of the natural language query;
   outputting the one or more operators as an intent and the one or more operands as one or more variables;
   converting, one or more concepts corresponding to the one or more variables into low-level variables based on a mapping of the one or more concepts with at least one naming convention used in a database storing flight information, wherein the low-level variables correspond to one or more parameters associated with a flight of an aircraft in the at least one naming convention used in the database;
   combining the intent and the low-level variables to form a database expression;
   querying a database storing flight information, using the database expression;
   creating at least one graphical representation based on a result of the querying of the database; and
   updating the one or more parameters associated with the flight of the aircraft based on the result of the querying of the database.

8. The system of claim 7, wherein the converting step includes using a reverse dictionary.

9. The system of claim 8, wherein the reverse dictionary includes a unified pipeline, and wherein the reverse dictionary comprises at least one term for avionics context.

10. The system of claim 7, wherein the processing step includes using multi-head attention to identify the one or more concepts.

11. The system of claim 7, wherein the processing step further includes identifying a filter of the natural language query.

12. The system of claim 7, wherein the processing step is performed by a module having a dependency graph architecture.

13. The system of claim 7, wherein the natural language query corresponds to the one or more parameters associated with the flight of the aircraft, wherein the one or more parameters comprises at least one of: a fuel usage, a cruising altitude, a default speed, and an engine parameter.

14. A non-transitory computer-readable medium containing instructions for natural language query translation, comprising:
   receiving, by one or more processors, a natural language query;
   processing, by the one or more processors, the natural language query to identify one or more operators and one or more operands of the natural language query;

outputting, by the one or more processors, the one or more operators as an intent and the one or more operands as one or more variables;

converting, by the one or more processors, one or more concepts corresponding to the one or more variables into low-level variables based on a mapping of the one or more concepts with at least one naming convention used in a database storing flight information, wherein the low-level variables correspond to one or more parameters associated with a flight of an aircraft in the at least one naming convention used in the database;

combining the intent and the low-level variables to form a database expression;

querying, by the one or more processors, the database storing flight information, using the database expression;

creating, by the one or more processors, at least one graphical representation based on a result of the querying of the database; and updating, by the one or more processors, the one or more parameters associated with the flight of the aircraft based on the result of the querying of the database.

15. The non-transitory computer-readable medium of claim 14, wherein the converting step includes using a reverse dictionary.

16. The non-transitory computer-readable medium of claim 15, wherein the reverse dictionary includes a unified pipeline, and wherein the reverse dictionary comprises at least one term for avionics context.

17. The non-transitory computer-readable medium of claim 14, wherein the processing step includes using multi-head attention to identify the one or more concepts.

18. The non-transitory computer-readable medium of claim 14, wherein the processing step further includes identifying a filter of the natural language query.

19. The non-transitory computer-readable medium of claim 14, wherein the processing step is performed by a module having a dependency graph architecture.

20. The non-transitory computer-readable medium of claim 14, wherein the natural language query corresponds to the one or more parameters associated with the flight of the aircraft, wherein the one or more parameters comprises at least one of: a fuel usage, a cruising altitude, a default speed, and an engine parameter.

* * * * *